United States Patent [19]
DeVito et al.

[11] Patent Number: 5,404,350
[45] Date of Patent: Apr. 4, 1995

[54] ROUTING CALLS DESTINED FOR INACCESSIBLE DESTINATIONS

[75] Inventors: Nicholas M. DeVito; William E. Hagerman, both of Naperville; Ted Moulos, Lisle, all of Ill.

[73] Assignee: AT&T Corp., Murray Hill, N.J.

[21] Appl. No.: 147,680

[22] Filed: Nov. 5, 1993

Related U.S. Application Data

[63] Continuation-in-part of Ser. No. 51,497, Apr. 22, 1993, abandoned.

[51] Int. Cl.⁶ .............................................. H04M 7/14
[52] U.S. Cl. ........................................ 370/16; 379/45; 379/221
[58] Field of Search .................. 370/16, 16.1, 13; 379/272, 273, 274, 279, 269, 45, 37, 221, 211, 212

[56] References Cited

U.S. PATENT DOCUMENTS

| | | | |
|---|---|---|---|
| 3,278,692 | 8/1963 | Bean et al. | 379/274 |
| 4,943,999 | 7/1990 | Ardon | 379/279 |
| 4,979,164 | 12/1990 | Ardon | 370/16 |
| 5,016,243 | 5/1991 | Fite, Jr. | 370/16 |
| 5,049,873 | 9/1991 | Robins et al. | 379/32 |
| 5,212,475 | 5/1993 | Thorne | 370/16 |
| 5,239,570 | 8/1993 | Koster et al. | 379/279 |

OTHER PUBLICATIONS

Bellcore Technical Reference, TR-NWT-000606, "LSSGR LATA Switching Systems Generic Requirements, Common Channel Signaling, Section 6.5", Issue 1, Nov. 1990.

*Primary Examiner*—Douglas W. Olms
*Assistant Examiner*—Huy D. Vu
*Attorney, Agent, or Firm*—Werner Ulrich

[57] ABSTRACT

An arrangement for selectively routing traffic to alternate destinations. If the network or switch for accessing the primary destination is inaccessible (i.e., out of service), as opposed to simply being busy, calls are routed to an alternate destination; however, if the primary destination is simply busy, calls are not routed to any alternate destination. This is useful, for example, for emergency (E911) calls which are routed to alternate emergency bureaus only if the network or switch for accessing the home bureau is out of service. Alternatively, the tandem switch can select an alternate toll carrier on the basis of allocation of traffic to different alternate toll carriers. The same general kind of arrangement can be used to route calls to an alternate toll carrier if the preferred toll carrier selected by the customer is not accessible.

4 Claims, 4 Drawing Sheets

ROUTING CALLS DESTINED FOR
INACCESSIBLE DESTINATIONS

This application is a continuation-in-part of application Ser. No. 08/051,497, filed on Apr. 22, 1993, abandoned.

TECHNICAL FIELD

This invention relates to methods of routing telecommunications calls.

1. Problem

Emergency service, such as the E911 service, is becoming increasingly prevalent in the United States. This service is used to route calls from customers requiring emergency services directly to a specialized emergency service bureau for initial screening and other handling of these calls.

An emergency service bureau is assigned for a particular geographic region and all calls to that region are handled in that service bureau. Because this service bureau is usually attended by public service employees responsible for the area, and because such service bureaus do not wish to burden their neighboring bureaus with overflow calls, calls that cannot be completed to the regional emergency service bureau, in most cases, are not routed elsewhere, but are queued in some manner to allow the callers to reach the bureau, or are returned busy signal.

A problem of the prior art is that this arrangement denies residents of a particular region all emergency service access when the emergency service bureau is inaccessible due to network outages or due to a failure of the serving switch. Under these circumstances, the residents of the region must try calling individual emergency services directly. A similar problem exists for large telephone customers having a plurality of regional automatic call distributors (ACDs) which normally handle only local traffic.

An additional problem of the prior art is that the method of handling situations wherein the preferred carrier selected by a customer, either through subscription or through the dialing of directing digits, is inaccessible because the toll switch for accessing the network of the preferred toll carrier is inaccessible.

2. Solution

The above problem is solved and an advance is made over the prior art in accordance with our invention, wherein switches of a carrier network are informed if the switch serving the local emergency service bureau (or the switch connected to a regional ACD) is inaccessible and are then permitted to route emergency service calls to other emergency service centers (or other ACDs), even if they normally do not do so. Advantageously, this alternate routing is only performed when the inaccessibility of the local emergency service bureau or local ACD is not due to a busy condition, thus maintaining the normal emergency service from the local emergency service bureau or service from the regional ACD under all circumstances except when that bureau or ACD is inaccessible.

In accordance with one aspect of the invention, signal transfer points, having access to the switch serving the emergency service bureau and to a switch of the carrier network, detect that the switch serving the emergency service bureau is inaccessible and send messages to those switches of the network that route calls to that emergency service bureau notifying them that the switch serving the bureau is inaccessible. These messages trigger an alternate routing strategy for emergency service calls in the switches that route calls to the switch serving the emergency service bureau. This alternate routing strategy may be to route a fraction of calls to each of several neighboring emergency service bureaus.

Routing for E911 calls or for calls to a regional ACD may be performed, according to the prior art, by a data base. In accordance with another aspect of the invention, this routing data base receives a transfer prohibit message from the Signal Transfer Points (STPs) for determining that a switch is inaccessible; the routing data base, which would normally route calls only to the local emergency service bureau or to the regional ACD, then routes calls to one or more alternate emergency bureaus or ACDs.

The problem of routing calls when the preferred carrier is inaccessible is solved by routing the call to an alternate carrier if it is determined that the ingress toll switch of the preferred carrier is not accessible. In that case, the call is routed, preferably after giving the caller an announcement to that effect, to a toll ingress switch of a backup carrier. The backup carrier can be selected for the toll access tandem switch or individually for each caller. Again, the same basic principle is used that the backup carrier is accessed only if the primary carrier toll ingress switch is inaccessible, not simply if the call is blocked in the network of the primary carrier.

DETAILED DESCRIPTION

Figure 1:
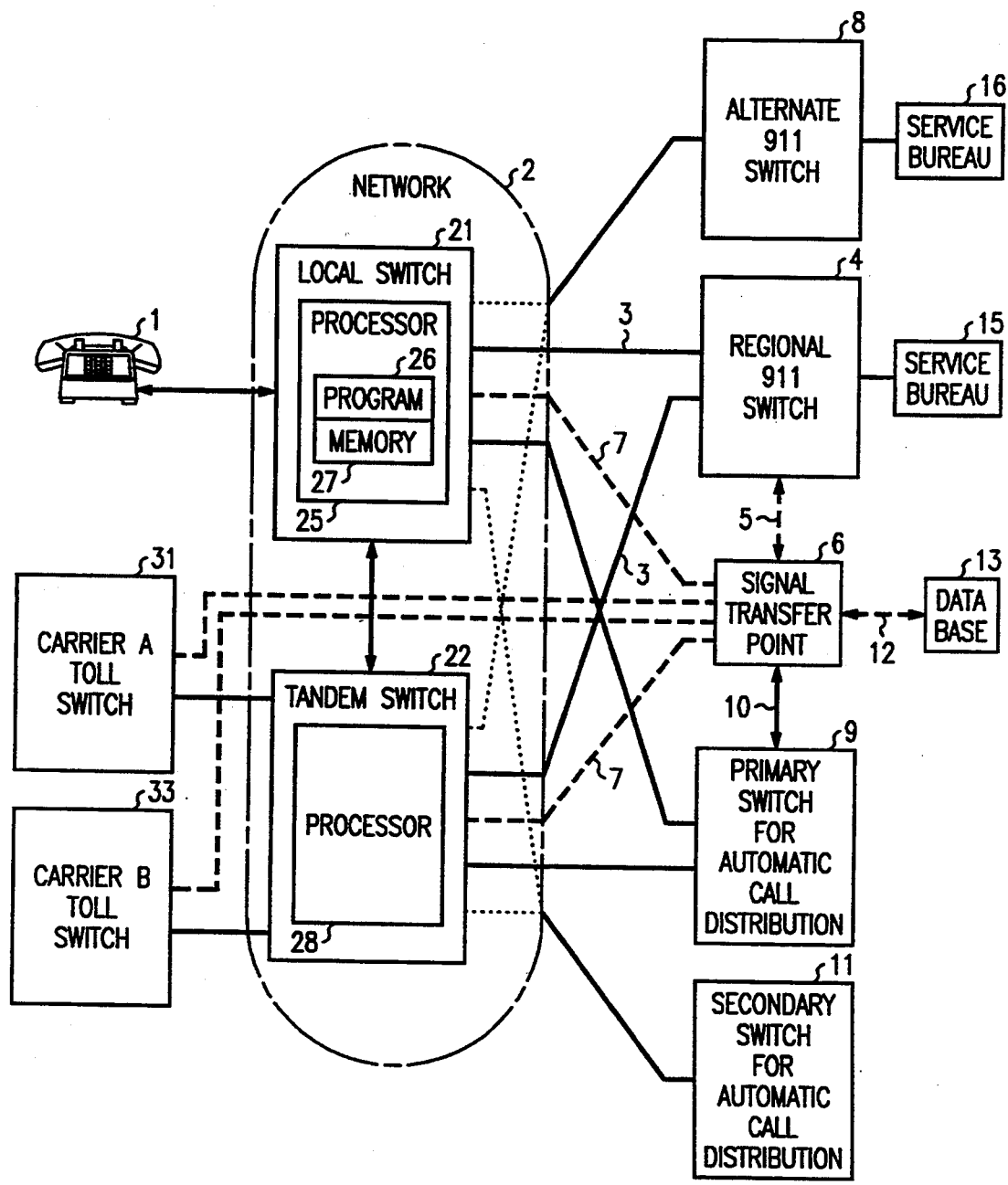
FIG. 1 is a block diagram illustrating the operation of applicants' invention.

FIG. 1 is a block diagram of the operation of the invention. Telephone station 1 is connected via network 2 and via trunks 3 to the switch 4 for serving the regional emergency service bureau 15. This switch 4 is connected by a signaling link 5 to signal transfer point 6. The signal transfer point is connected via signaling links 7 to the local exchange carrier network. As is well known in the prior art, at least two STPs serve each switch in order to provide for reliable signaling. For simplicity, only one such STP is shown. In addition, different STP pairs or groups serve different regions so that it is possible that the STP serving switch 8 or switch 11 may be a different STP from the STP serving switches 4 and 9. The coordination of a plurality of STPs is also well known in the prior art and is performed by having links interconnecting the STPs so that the STPs may forward messages received over these inter-STP links. If STP 6 detects, through absence of messages from switch 4, that it cannot communicate with switch 4, then STP 6 transmits a transfer prohibit message over message link 7 to the carrier network 2 to inform the appropriate switches that STP 6 cannot communicate with switch 4. If the switches of network 2 receive similar messages from other STPs serving the region, the switches mark switch 4 inaccessible, indicating that calls should not be routed to switch 4. Calls would then be routed to a switch such as switch 8 serving an alternate emergency service bureau 16; in some cases, switch 8 may also be connected to service bureau 15, in which case calls would be routed from switch 8 to service bureau 15. The same actions are performed if the primary destination is a regional ACD for a customer, the regional ACD homing on switch 9. If switch 9 is available, the call is routed only to switch 9. If it is not available, the call is routed to a secondary switch 11 for an alternate ACD of the customer.

The routing, especially for the ACD case, may be performed using a data base 13. This data base also receives transfer prohibit messages from STP 6 and other STPs serving the region for determining whether switch 9 is unavailable; if so, the routing message to the switch requesting the routing specifies an alternate switch such as switch 11; otherwise, only the primary switch 9 is specified in the routing message.

The call is switched either directly from local switch 21, connected to the caller, or from a tandem switch 22 which receives the call from local switch 21. A preselected one of these switches makes the routing decision in any particular network configuration.

Figure 2:
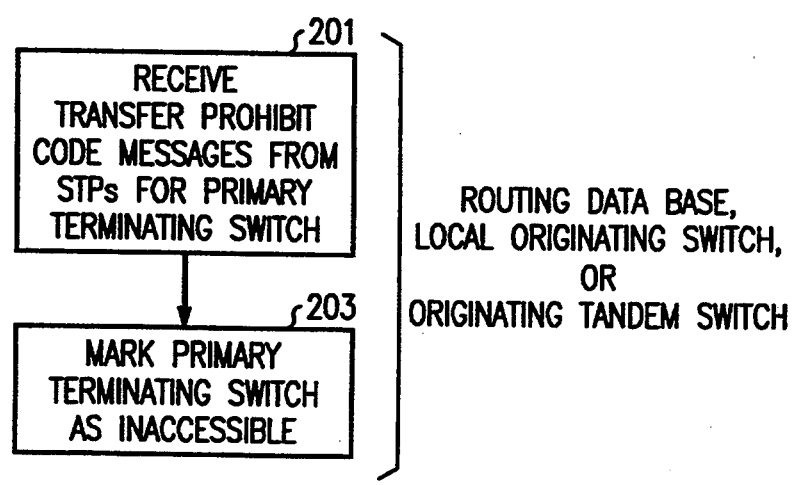
FIGS. 2–4 are flow charts illustrating the methods of applicant's invention.

FIG. 2 is a flow diagram of a program executed in one of the switches of local exchange carrier network 2. This switch receives transfer prohibit messages for switch 4 from signal transfer point 6 and other STPs serving the region (action block 201); the receipt of one of these messages from each of these STPs indicates an inaccessible point code, i.e., an inaccessible switch. In response to receiving these messages, the receiving switch marks the trunk group to switch 4, inaccessible (action block 203).

Figure 3:
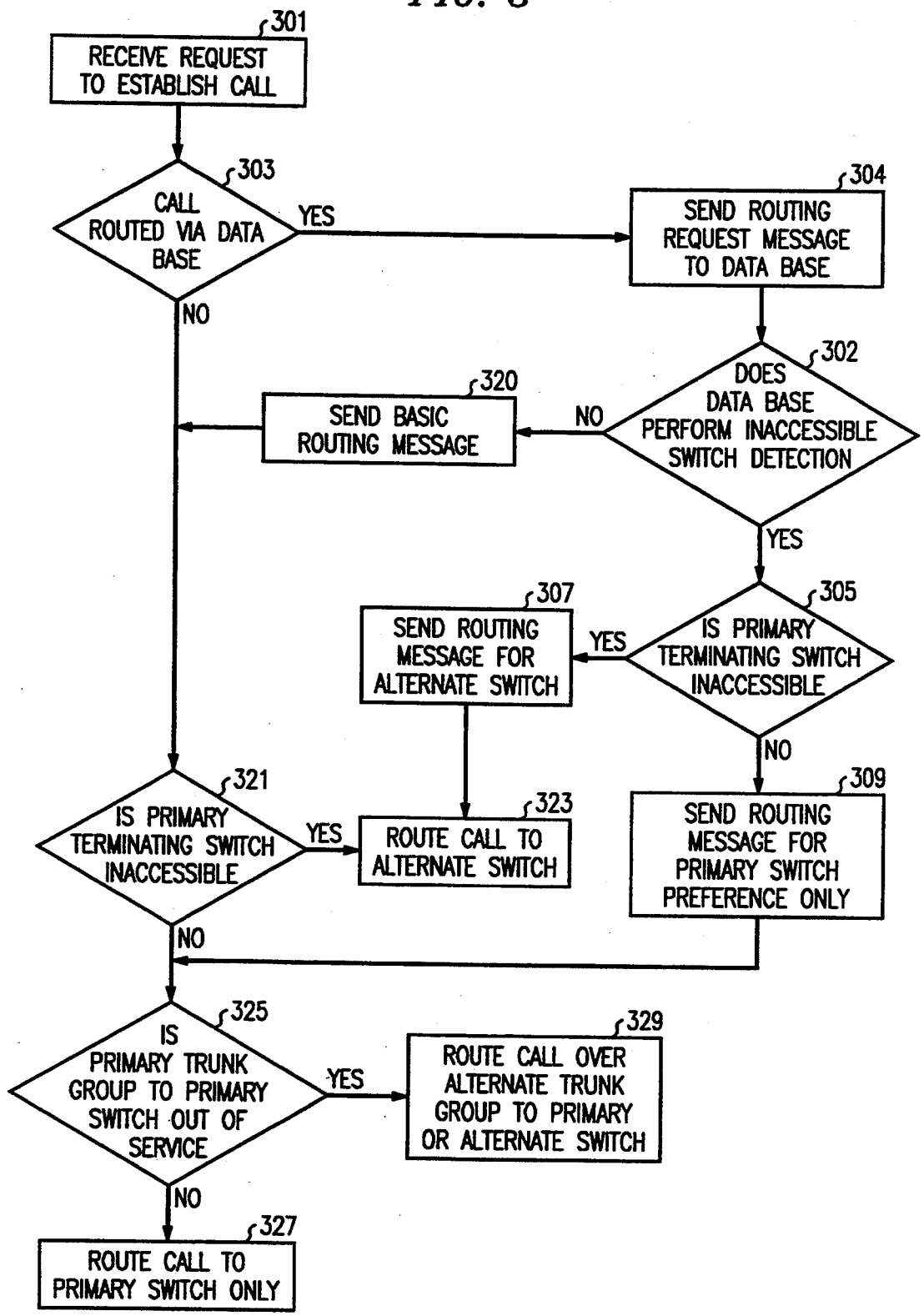

FIG. 3 is a flow diagram of the processing of a call in a switch 21 or 22 of the carrier network 2. That switch receives a request from a customer such as customer 1, to establish a call (action block 301). The switch tests whether the call is routed in a data base (test 303). If so, the data base tests whether it performs inaccessible switch detection (test 302). If the data base performs inaccessible switch detection, the data base tests whether the primary terminating switch is inaccessible (test 305). If so, the data base sends a routing message to the requesting switch to route the call to an alternate switch (action block 307 to be followed by action block 323). If not, the data base sends a routing message to route the call to the primary switch preferentially (i.e., unless the trunk group to the primary switch is out of service) (action block 309 to be followed by test 325).

If the call is not routed via a data base (negative result of test 303), or if the data base does not perform inaccessible switch detection but simply sends a basic routing message (action block 320), test 321 is used to determine whether the primary switch is inaccessible. If so, the call is routed to an alternate switch (action block 323), using the prior art techniques for attempting to use successive alternate routes; alternatively, if the primary trunk group to the alternate switch is busy, further alternate routing could be abandoned. If the primary switch is accessible, test 325 is used to determine whether the trunk group to the primary switch is out of service. If so, the call is routed to an alternate trunk group which may be connected to the primary or an alternate switch (action block 329). If not, the call is routed to the primary switch only (action block 327). Tandem switch 22 also serves as a toll access tandem switch for accessing toll carrier networks. Toll switch 31 is the ingress toll switch for carrier A and toll switch 33 is the ingress toll switch for carrier B. In this case, it is assumed that carrier A is the preferred carrier selected for a call. This preference is expressed either through a subscription by the caller to that carrier or through the dialing of directing digits for that call.

Figure 4:
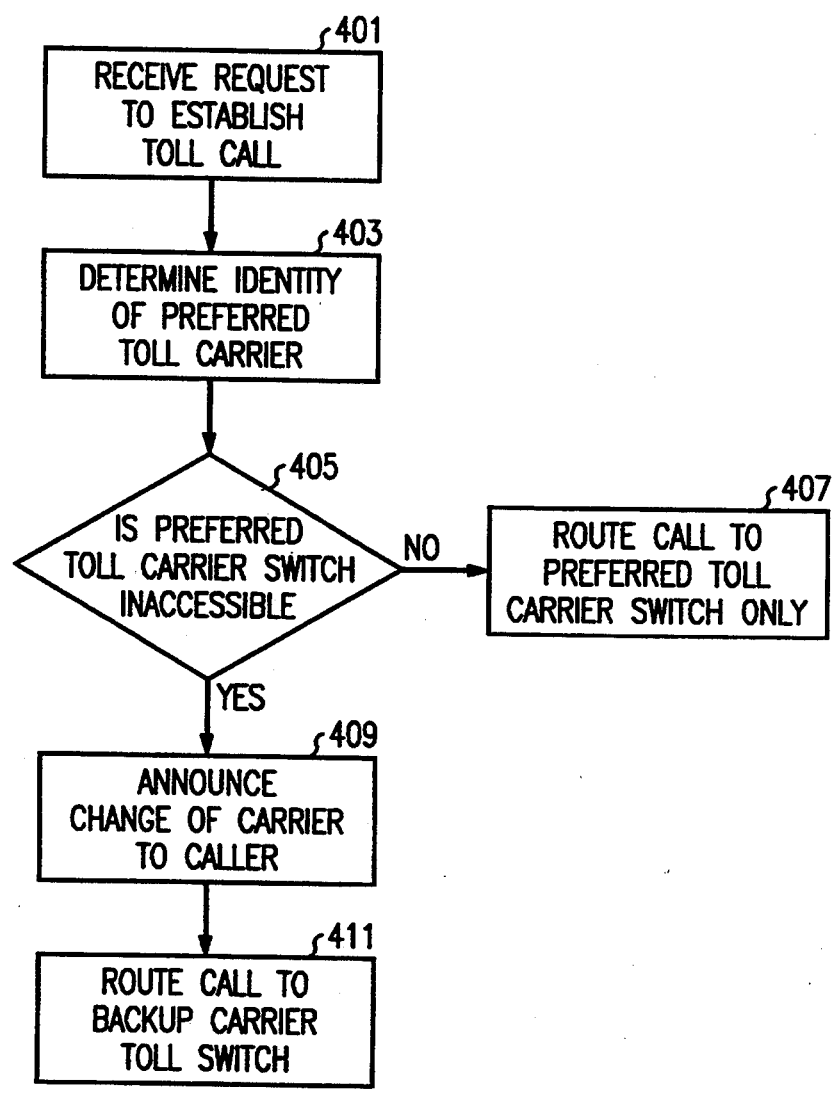

Assume in the particular example that carrier A is the preferred carrier. FIG. 4 illustrates the method executed in tandem switch 22 for advancing the call via either toll carrier A or toll carrier B. In block 401 the toll call is received in tandem switch 22. Tandem switch determines the identity of the preferred toll carrier in block 403. This determination is based on information passed on by the local switch. Test 405 determines whether the preferred toll carrier switch is inaccessible. If the preferred toll carrier switch is not inaccessible, then the call is routed to the preferred toll carrier switch (action block 407). If the preferred toll carrier switch is inaccessible, then an announcement is made to the caller indicating that the call will be routed via the alternate carrier (in this case carrier B) (action block 409) and the call is then routed to the backup carrier toll switch (action block 411).

In the case of the accessing the preferred or the backup toll carrier the example showed the use of a toll access tandem switch 22. In some networks these switches may be directly accessed from the local switch 21.

In some cases it may be desirable to perform the routing to an alternate 911 switch 8, a secondary switch for automatic call distribution 11, or a backup toll switch 33 in cases in which the toll facilities for accessing the primary regional 911 switch 4, the primary switch for automatic call distribution 9, or the preferred carrier toll switch 31, are unavailable. Effectively, the definition of inaccessibility can be expanded to include an outage (not just a busy state) of the trunk facilities required for accessing the needed switch.

It is to be understood that the above description is only of one preferred embodiment of the invention. Numerous other arrangements may be devised by one skilled in the art without departing from the scope of the invention. The invention is thus limited only as defined in the accompanying claims.

It is claimed:

1. In a telecommunications network a method of routing a call to an alternative destination, said method comprising the steps of:

receiving said call in said telecommunications network;

if a primary circuit switching system for serving a primary destination becomes inaccessible, receiving in a circuit switching system for routing said call, or in a routing data base for providing data for routing said call to said circuit switching system for routing said call, an indication from said network of primary circuit switching system inaccessibility;

subsequently, responsive to receipt of a request to route said call to said primary destination, testing, in said circuit switching system for routing said call, or in said routing data base, whether said primary circuit switching system is accessible;

if said primary circuit switching system is accessible, attempting to route said call only to said primary circuit switching system; and if said primary circuit switching system is not accessible, attempting to route said call to an alternate circuit switching system for serving an alternate destination, said alternate circuit switching system different from said primary circuit switching system;

wherein said network comprises at least one Signal Transfer Point, STP, and wherein said receiving an indication comprises:

receiving a message from an STP for signaling to said primary circuit switching system indicating that said at least one STP cannot communicate with said primary circuit switching system.

2. The method of claim 1 wherein said step of receiving a message comprises the step of receiving at least one transfer prohibit message.

3. In a telecommunications network a method of routing a call to an alternative destination, said method comprising the steps of:

receiving said call in said telecommunications network;

if a primary circuit switching system for serving a primary destination becomes inaccessible, receiving in a circuit switching system for routing said call, or in a routing data base for providing data for routing said call to said circuit switching system for routing said call, an indication from said network of primary circuit switching system inaccessibility;

subsequently, responsive to receipt of a request to route said call to said primary destination, testing, in said circuit switching system for routing said call, or in said routing data base, whether said primary circuit switching system is accessible;

if said primary circuit switching system is accessible, attempting to route said call only to said primary circuit switching system; and if said primary circuit switching system is not accessible, attempting to route said call to an alternate circuit switching system for serving an alternate destination, said alternate circuit switching system different from said primary circuit switching system further comprising:

responsive to receiving said call, said circuit switching system for routing said call requests routing data for said call from said routing data base; and wherein said circuit switching system for routing said call receives said routing data from said routing data base.

4. In a telecommunications network, comprising a plurality of toll carrier networks each comprising ingress circuit switching systems for receiving calls from a local carrier and egress circuit switching systems for transmitting calls to a local carrier, a method of routing a toll call to a toll carrier network, said method comprising the steps of:

if an ingress circuit switching system for a toll carrier network becomes inaccessible, receiving in said telecommunications network an indication of toll carrier ingress circuit switching system inaccessibility for said toll carrier network;

receiving said toll call in said telecommunications network;

determining a preferred toll carrier network of said plurality of toll carrier networks for said toll call;

testing whether a toll carrier network ingress circuit switching system is accessible for said preferred toll carrier network;

if the toll carrier network ingress circuit switching system for said preferred toll carrier network is accessible, attempting to route said toll call only via said preferred toll carrier network; and if said preferred toll carrier ingress circuit switching system is not accessible, attempting to route said call via an alternate toll carrier network accessed via an ingress circuit switching system of said alternate toll carrier network;

wherein prior to attempting to route said call via said alternate toll carrier network an announcement is made to a caller of said call indicating a change of toll carrier network.

* * * * *